Feb. 5, 1952 — W. POOL — 2,584,226
APPARATUS FOR THE DELIVERING OF LIQUID UNDER PRESSURE
Filed May 25, 1946

Inventor
W. POOL

Feb. 5, 1952 W. POOL 2,584,226
APPARATUS FOR THE DELIVERING
OF LIQUID UNDER PRESSURE
Filed May 25, 1946 4 Sheets-Sheet 2

Inventor
W. POOL

Feb. 5, 1952     W. POOL     2,584,226
APPARATUS FOR THE DELIVERING
OF LIQUID UNDER PRESSURE

Filed May 25, 1946     4 Sheets-Sheet 4

Inventor
W. POOL
By
Attorneys

Patented Feb. 5, 1952

2,584,226

UNITED STATES PATENT OFFICE 2,584,226

APPARATUS FOR THE DELIVERING OF LIQUIDS UNDER PRESSURE

William Pool, Spondon, near Derby, England, assignor to Celanese Corporation of America, a corporation of Delaware Application May 25, 1946, Serial No. 672,221
In Great Britain June 4, 1945

10 Claims. (Cl. 18—8)

This invention relates to apparatus for the delivering of liquids under pressure and particularly to the delivering of liquids at a constant volumetric rate, and is especially concerned with the delivering of liquids having a basis of a fibre- or film-forming substance through extrusion orifices of appropriate shape and size, for the production of artificial filaments, foils, films and like materials.

The problem of maintaining constant the volumetric rate of extrusion is one that must be constantly borne in mind in the production by extrusion of such artificial products, in order to ensure that the extruded products are of a cross-sectional area that is uniform along their length. Different means may be employed for applying the pressure by which the liquids are extruded. Thus, the liquids may be extruded by the application of an inert gas under pressure to a body of liquid that is free to escape, by way of suitable filters, through the extrusion orifices. Constancy of the rate of extrusion in this case depends on the constancy of the resistance to flow offered by the filters and extrusion orifices, and as this is very liable to vary in the course of the extrusion operation this method is apt to be very unsatisfactory. Alternatively the materials may be extruded by means of a pump carefully designed and constructed in order to give a constant rate of delivery when driven at a constant speed. Even in this case, however, variations in the resistance of the filters and spinning orifices are apt to give rise to some variation in the rate of extrusion. To overcome this difficulty the pump may be arranged so as to work with equal pressures on its inlet and outlet sides, auxiliary means being employed to supply the liquid under pressure to the inlet side of the pump and liquid being by-passed from said inlet side back to the source of supply at such a rate, under the joint control of pressures on the inlet and the outlet sides of the pump, as to make the pressure on the inlet side of the pump equal to that of the outlet side. An example of such an arrangement is described in British specification No. 182,154, in which each measuring pump is preceded by a pilot pump adapted to deliver an excess of liquid to the measuring pump, liquid being by-passed back across the pilot pump through a valve automatically controlled in accordance with the pressures on the delivery sides of the two pumps. It is an object of the present invention to provide a further improvement in the means and methods for the delivery of liquids at a constant volumetric rate by means of a measuring pump, in which improvement the by-pass of the liquid from the inlet side of a measuring pump is avoided.

According to the present invention a method of delivering a liquid at a constant volumetric rate comprises supplying the liquid under pressure to a measuring pump by applying to a body of the liquid an inert fluid under pressure, driving the said measuring pump so as to deliver said liquid, and adjusting the pressure of said inert fluid under the control of the delivery pressure in said liquid on the outlet side of said pump so as to maintain said inert fluid pressure substantially equal to said delivery pressure. In this way, the liquid is metered from the body of liquid, and the pressure applied by the inert fluid to the body of liquid is adjusted in accordance with the pressures in the liquid immediately before and immediately after metering so as to maintain said pressures substantially equal. As in British specification No. 182,154, the pressure on each side of the measuring pump, by which the metering is effected, is the same so that the pump acts as an accurate measuring device undisturbed by any pressure difference across the metering operation, i. e. between the inlet and outlet of the pump. At the same time the necessity of providing for the return flow of the liquid delivered to the measuring pump but not accepted by it is avoided. While an inert liquid may be used for the purpose of the invention, it is generally convenient to employ an inert gas, e. g. nitrogen, or other gas, according to the nature of the liquid to be pumped, and the invention will be described hereafter with reference to the use of such an insert gas.

While the invention is applicable to the delivering of liquids generally at a constant volumetric rate, it is particularly advantageous in the production of artificial products by the spinning or extrusion of filament-forming liquids, and more particularly melt-spinning i. e. the extrusion of fused thermoplastic filament-forming materials. With such materials it is often desirable, and sometimes essential, that they should be melted immediately before extrusion and not kept for a long period in the molten condition or transported by pipe lines in that condition to the point of use. For these reasons it is desirable that the materials should be melted in a melting vessel in the immediate neighbourhood at the point of extrusion, a circumstance which makes it convenient to bring about the extrusion of the liquid by applying a gas pressure thereto, the gas pressure being applied in the vessel in which the materials are melted. Not only can such gas pressure be conveniently applied to the vessel in which melting takes place but also the possibility of causing some parts of the material to remain for long periods in a molten state before being extruded, through repeated return flow and re-circulation of molten material, is avoided. Moreover, it is a considerable advantage to have only one pump, instead of two pumps and a system of by-pass passages and valves, subjected to the temperature necessary to melt the material, which temperature is often very high e. g. of the order of 300° C. or more.

A further advantage of the invention that applies particularly to melt-spinning is that the material, from the time that it is subjected to melting temperature until the time it is extruded, is maintained under a substantial pressure whereby the formation of small bubbles therein, such as would interfere with the uniformity, strength and appearance of the extruded products is substantially inhibited. Indeed, it may be advantageous to maintain a higher pressure on the material up to the point of extrusion than would otherwise be necessary, e. g. by the inclusion of extra filters or throttling devices in the path of the material to the extrusion orifices.

The control of the gas pressure on the material being extruded may conveniently be effected by supplying gas from a source of supply at a high pressure through a reducing valve, on the delivery side of which the gas is allowed to leak at a controlled rate to atmospheric pressure. The adjustment of the leak provides means whereby the pressure drop between the high pressure source of supply and the vessel to which it is to be delivered may readily be controlled, the amount of this pressure drop depending on the amount of gas flow through the leak and the setting of the reducing valve. The leak may readily be controlled jointly by the pressure in the liquid on the delivery side of the measuring pump and the pressure in the gas actually delivered to the melting vessel. Means may also be provided to cut off the leak entirely in the event that the pressure on the delivery side of the measuring pump fails for any reason. If the pressure on the delivery side of the pump becomes excessively high the leak will be cut off in any case, but further provision may be desirable for stopping the measuring pump altogether in such an event, when the pressure on the delivery side of the pump will fall again.

The invention may be employed in conjunction with means for feeding fresh spinning material to the body of liquid that is subjected to the gas pressure, so that extrusion may proceed continuously. Thus a pressure lock may be employed that is connected to the source of supply of inert gas, as described in U. S. Patent No. 2,437,686 or it may be such as to be substantially filled by the charge of composition as described in U. S. Patent No. 2,437,704. The feeding of fresh composition may be automatically controlled in accordance with the level of liquid within the melting vessel, e. g. as described in British Patent No. 573,325 especially when, as described in U. S. Patent No. 2,437,685 the melting of the material is effected by means of a heating liquid in which the solid material is immersed.

By way of example, one form of melt-spinning apparatus employing the method of the present invention will now be described in greater detail with reference to the accompanying drawings in which.

Figures 1, 2, 3:
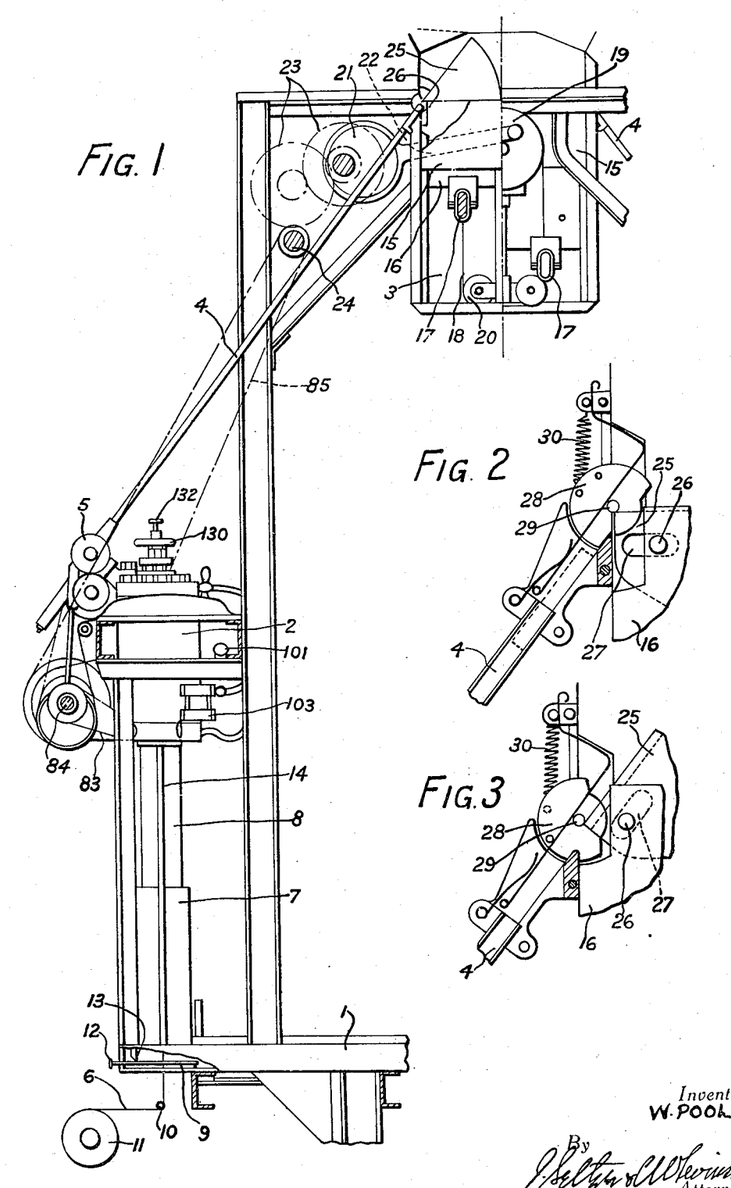
Fig. 1 is a diagrammatic side elevation showing the layout of the apparatus as a whole.
Figs. 2 and 3 are details of the hopper feed mechanism shown in Fig. 1.

Referring to Fig. 1, the apparatus shown therein is a double-sided machine, although only the left-hand side is shown except for the details at the top of the machine.

The machine comprises a general frame-work 1 carrying on each side a series of melting and extrusion vessels 2 (of which only one is visible in Fig. 1) of the kind described in British Patent No. 573,325 and U. S. Patent No. 2,437,704. The vessel 2 is fed with solid filament-forming material in the form of short sticks supplied from a hopper 3 by way of a tubular chute 4 and through a feeding mechanism 5 of the kind particularly described in British Patent No. 573,325. Filaments 6 extruded from the bottom of the vessel 2 pass through a tubular cell 7, 8 in which they solidify. The filaments then pass round a guide plate 9 and a guide 10, and on to a collecting roller 11. The guide plate 9 is in the form of a flat horizontal plate having a deep V-notch in its right-hand edge, the angle of which constitutes the guide for the filaments 6. The plate 9 can be drawn out by means of a handle 12 so as to allow the filaments to fall freely through the tubes 7, 8 on starting. Any casual drops or splashes of the filament-forming material falling through the tube 8 in the course of starting collect on the plate 9 and are scraped off by means of the scraper 13. The cell 7, 8 is telescopic, the upper part 8 being mounted on guides 14, so that it can be slid downwards, inside the lower part 7 and give access to the bottom of the vessel 2.

The hopper 3 from which the sticks of filament-forming material are supplied comprises a pair of oblique plates 15, the lower edges of which do not quite meet, but leave a slot through which rises and falls a vertical plate 16. A series of such hoppers is provided, one for each vessel 2, and the several plates 16 thereof are operated by means of a bar 17. The two bars 17 on the two sides of the machine are connected to one another by means of chains 18, which pass round pulleys 19, 20. The upper pulley 19 is rocked to and fro by means of an eccentric 21 and connecting rod 22 driven through gears 23 from a shaft 24. In this way the plates 16 are caused to rise and fall. The plate 16 is hollow being formed of two sheets of metal, and its upper edge is constituted by a quadrant 25 pivoted inside plate 16 about a pin 26 and adapted to swing, when the plate 16 reaches its uppermost position, so as to bring the upper edge of the quadrant 25 into alignment with the chute 4. The details of the mechanism for this purpose are shown in Figs. 2 and 3. The pivot pin 26 extends through a slot 27 in the quadrant 25. As the plate 16 rises the upper front corner of the quadrant 25 engages, as shown in Fig. 2, with a rocking member 28 pivoted at 29 and loaded by means of a spring 30. The continued movement of the plate 16, as shown in Fig. 3, causes the quadrant 25 and member 28 to tilt about 29 so that the upper edge of the quadrant is in alignment with the chute 4. Each time the plate 16 rises it picks up a stick of material, with which the hopper space between the plates 15 is filled, and tilts it into the chute 4, into which it slides provided that the chute is not already filled. If the chute is already filled, or if a stick of material falls across instead of along the upper edge of the quadrant 25, the stick of material is merely tilted back into the hopper.

Figure 4:
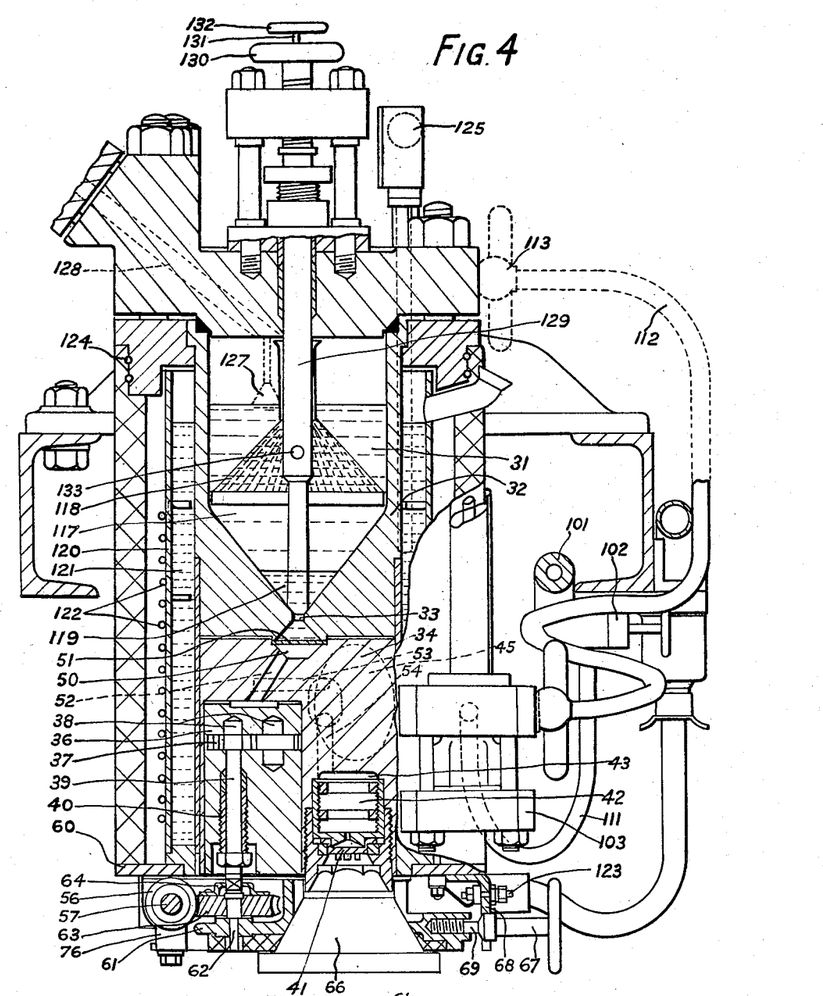
Fig. 4 is a side elevation in section of the melting and extrusion vessel.

Fig. 4 is a side elevation, partly in section, of the melting and extruding vessel 2. Melting takes place in a chamber 31 which is of cylindrical form at the top and of conical form at the bottom and is formed in the upper part of the cylindrical steel vessel 32. From the apex 33 of the conical part of the chamber 31 a passage leads to a cylindrical metal block 34 constituting the lower part of the vessel 32, which is secured to the upper part by means of bolts 35 (Fig. 6) and containing, in suitable cavities formed therein, the spinning pump, the spinning jet and filters and associated parts, and the pressure-sensitive means by which the rate of extrusion is controlled. The spinning pump 36 is a gear pump in the form of a cylindrical block of metal horizontally divided into three parts, the middle part being cut away to accommodate the gears 37. The spindles 38 of the gears extend vertically into bearings in the upper and lower parts of the cylindrical block, one spindle 39 extending completely through the lowest division of the block by way of a gland 40, and emerging from the bottom to serve as the driving shaft for the pump.

Figure 6:
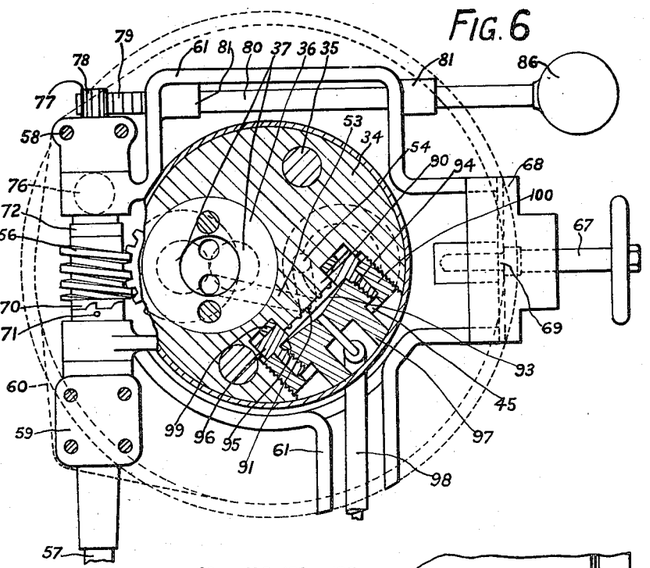
Fig. 6 is a sectional plan view.

The spinning jet 41 and filters 42, as shown in Fig. 4, are fitted into a second cylindrical cavity 43 in the block 34, the cavity 43 being internally screw-threaded for this purpose. The third cylindrical cavity is generally indicated at 45 in Fig. 4, but is shown in greater detail in Figs. 6 and 10. Fig. 6 is a sectional plan view in which the line of section over the area of the block 34 is the horizontal centre line of the cavity 45. The remainder of the section, however, surrounding the block 34, is taken at a lower level to show the means for driving the pump 36. Each of these three figures shows the fluid connections within the block 34. An inlet hole 50 in the top centre of the block 34 communicates with the outlet 33 of the melt chamber 31, a small filter 51 extending across the hole 50, being clamped between the block 34 and the bottom of the melt chamber 31. From the inlet 50 a passage 52 leads to the inlet side of the measuring pump 36, and from the outlet side of the measuring pump a further passage 53 leads to the bottom of the cavity 45. A third passage 54 connects the bottom of the cavity 45 with the top of the cavity 43 containing the filter and jet assembly 41, 42.

Figure 5:
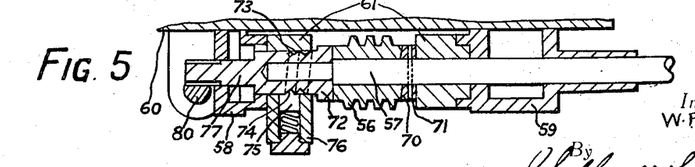
Fig. 5 is a section of a detail of Fig. 4.

The spinning pump 36 is driven, as shown in Figs. 4, 5 and 6, by means of a worm 56 mounted on a horizontal shaft 57. Pivoted about the axis of the shaft 57 in bearings 58, 59 screwed to the bottom plate 60 of the vessel 2 is a horizontal framework 61 in which is journaled the lower end of a short shaft 62 carrying a worm gear 63. A slotted yoke 64 on the upper face of the worm gear 63 receives the squared lower end of the pump shaft 39, forming a dog connection which can be broken by swinging the frame 61 downwards about the worm shaft 57. The worm gear 63 constantly engages the worm 56, whatever the position of the frame 61. The frame 61 also carries a funnel-shaped shield 66 lying directly below the jet 41 and serving to protect filaments emerging from the jet from draughts. A screw 67 mounted on the frame 61 passes through a key-hole cavity in a bracket 68 secured to the bottom plate 60 and, when screwed home maintains the frame in its working position. When the screw 67 is partly unscrewed, however, a narrow portion 69 thereof registers with the keyhole cavity and permits the frame 61 to be swung downwards, giving access to the bottom of the block 34.

The worm 56 is driven by the worm shaft 57 by means of a dog clutch 70, one member of which is formed integral with the worm, while the other is secured to the worm shaft 57 by means of a pin 71. The dog clutch 70 is held in engagement by means of a collar 72 into which one end of the worm shaft 57 is journaled. The shaft 57 is also journaled in the bearing 59. The collar 72 is journaled in the bearing 58 and has formed on its outer surface a double turn of deeply-cut screw thread 73, as shown in Fig. 5. The screw thread 73 is engaged by a tooth 74 on the end of a spring plunger 75 carried in an extension 76 of the frame 61. The collar 72 extends past the bearing 58 in the form of a shaft 77 and has gear teeth 78 formed on its free end which engage with a rack 79 formed on a horizontal plunger 80 which slides in bearings 81 in the frame 61.

Through these means the measuring pump 36 is driven by driving the worm shaft 57, which is done, as shown in Fig. 1, by a chain drive 83 from the main shaft 84 of the machine, from which also the shaft 24 is driven by chain 85. If, however, the pump 36 encounters undue resistance so that the worm gear 63 cannot rotate, the continued rotation of the worm 56 drives the worm away from the clutch 70 until the clutch is disengaged. This also moves the collar 72 axially, the tooth 74 riding over the screw threads 73 until it re-engages with the next thread, when it serves to hold the clutch 70 out of engagement. The driving of the pump 36 may also be stopped by hand by pressing the knob 86 of the plunger 80, the collar 72 in this case being rotated so as to move axially under the influence of the tooth 74 engaging the thread 73 and to allow the clutch 70 to disengage. The pump 36 may be restarted by forcing in the plunger 80 (if it has not already been forced in to stop the pump by hand) and withdrawing it so as to re-engage the worm clutch.

The pump 36 delivers molten material through the passage 53 to the cavity 45. The cavity 45 is in the form of a shallow cylinder having at the bottom a steep-sided, flat-topped boss 90 provided with two concentric annular ridges 91. The delivery passage 53 emerges through the top of the boss 90 close to the upper edge thereof, and the passage 54 communicating with the filter 42 emerges through the top of the boss 90 close to its lower edge.

The pressure sensitive element comprises a flat, circular diaphragm 93 mounted at the bottom of a short cylinder 94 having internal and external flanges 95, 96. The inside of the cylinder 94 is screw-threaded and the diaphragm 93 is nipped against the internal flange 95 by means of a screw-threaded plug 97. The inner face of the plug is recessed to form a flat, conical space between the plug and the diaphragm, and the plug is axially bored to receive a pressure tube 98 communicating with this space. The inner flange 95 fits closely round the boss 90 so as to enclose a flat, circular space between the face of the boss 90 and the diaphragm 93. The diaphragm is kept just out of contact with the tops of the annular ridges 91 by means of a hard packing ring 99 fitting about the boss 90 in the bottom of the cavity and engaged by the inner flange 95. The outer flange 96 is engaged by a ring 100 screwed into the cavity 45 so as to hold the entire pressure sensitive element firmly in place.

In the operation of the device the passages 52, 53, 54 and the space between the boss 90 and the diaphragm 93 are filled with the material to be extruded on its way from the pump 36 to the jet 41. The space between the diaphragm 93 and the inner face of the plug 97, and the pressure tube 98 communicating with that space, are filled with an appropriate incompressible fluid, e. g., petroleum jelly.

Figure 7:
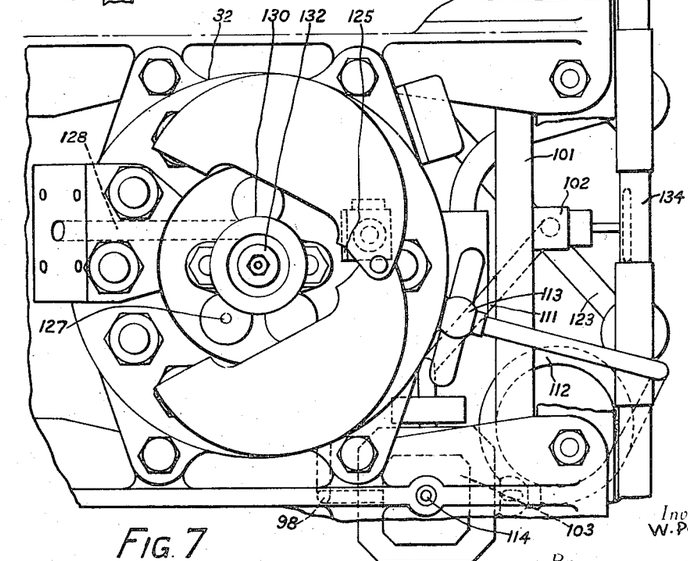
Fig. 7 a complete plan view of the melting and extrusion vessel shown in Fig. 4.
Figures 8, 9, 10, 11:
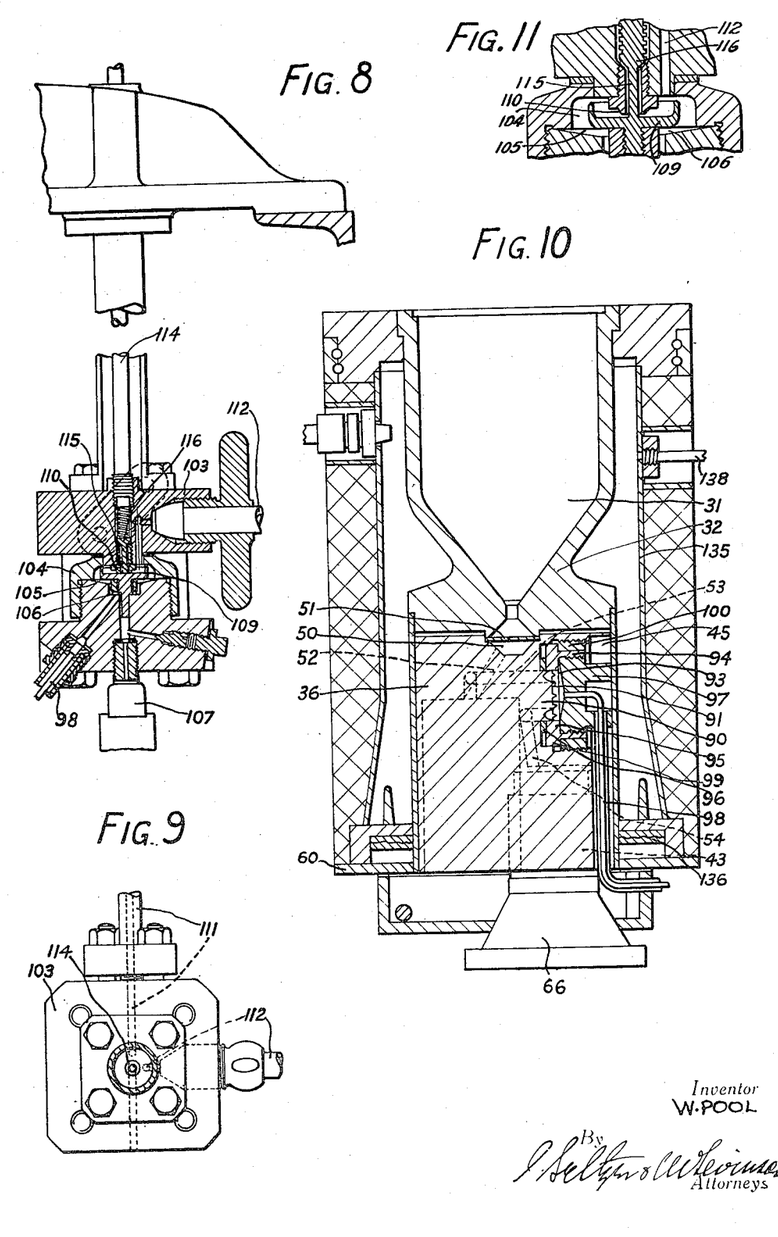
Figs. 8 and 9 are a side elevation and a plan view of a detail of Fig. 4.
Fig. 10 a section of a melting and extrusion vessel showing a further detail of the flow control means and an alternative method of heating the vessel.
Fig. 11 is an enlarged view of a detail of Fig. 8.

Referring now particularly to Figs. 4 and 7, a high-pressure main 101 supplies an inert gas under pressure, e. g., hydrogen or nitrogen, to the top of melt chamber 31 by way of a sensitive needle valve 102 and a leak assembly 103 which is shown in greater detail in Figs. 8, 9 and 10. Each of the elements 102, 103 offers a substantial and adjustable resistance to the flow of gas.

The needle valve 102 is of conventional construction. The leak assembly 103 comprises a thick-walled chamber 104 divided into two parts by a diaphragm 105 firmly clamped at its edges. The space 106 below the diaphragm communicates, by way of the pressure tube 98, with the pressure-sensitive element in the cavity 45, and is filled with the same incompressible fluid. The part 106 of the chamber 104 also communicates with a pressure gauge as indicated at 107. The part of the chamber 104 above the diaphragm 105 contains a plate 109 centrally secured to the diaphragm, the surface of the plate 109 lying close to the edges of a conical nozzle 110 entering the chamber 104 centrally from above. The line 111 from the needle valve 102 enters the chamber 104 above the diaphragm 105, and the line 112 leading to the melt chamber 31 leaves the chamber 104 from above the diaphragm, both passages being offset from the axis of the chamber 104, as shown in Fig. 9. The line 112 enters the top of the chamber 31 at 113. Leakage of gas passing from the needle valve 102 to the melt chamber 31 takes place through the central nozzle 110, the leaking gas is led away through the pipe 114. If desired, the pipe 114 may be led down and deliver the leaking gas inside the funnel shaped shield 66, so as to keep the hot filaments emerging from the jet 41 in an inert atmosphere, and prevent their oxidation. The rate of leakage through the nozzle 110 is controlled by the position of the plate 109 in relation to the edge of the nozzle 110.

When the pressure on the delivery side of the measuring pump 36 is high, the pressure in the lower part 106 of the leak assembly 103 is also high, so that the diaphragm 105 and plate 109 are raised. In consequence, the leak through the nozzle 110 is diminished by the approach of the plate 109 to the edge of the nozzle. This leak represents substantially the whole of the flow taking place through the needle valve 102, and its diminution diminishes the pressure drop across the needle valve. This raises the pressure in the melt chamber 31 and that in the upper part of the leak assembly chamber 104 to a value more nearly equal to the pressure within the main 101. When these pressures are substantially equal to the pressure on the delivery side of the measuring pump 36, which is also the pressure in the space 106, a balance is achieved. The resistance to deflection of the diaphragms 93 and 105 is low, so that the pressure difference in each case required to bring about the deflection necessary to balance the pressures on the inlet and outlet sides of the pump 36 is negligible in relation to the magnitude of those pressures. It will be seen that the diaphragms 93, 105 act in unison, on account of the incompressible fluid enclosed between them, so that it would be possible to control the rate of leak by disposing the nozzle 110 close to the face of the diaphragm 93, and omitting the diaphragm 105 altogether. The arrangement shown, however, is more convenient in construction, assembly and operation.

In order to prevent undue leakage of gas in the event of failure of the pump 36, a cut-off valve is provided adapted to act when the pressure on the delivery side of the pump 36 falls unduly. For this purpose, a valve rod 115 is provided centrally upstanding from the plate 109 and passing up through the nozzle 110. The upper end of the rod 115 carries a valve member 116 adapted to engage with a conical seating in the passage by which gas escapes through the nozzle 110. When the pressure on the delivery side of the pump 36 and therefore in the lower part 106 of the chamber 104 falls, the plate 109 drops to such an extent as to bring the valve member 116 down on its seating, thus cutting off the leak altogether. In this way, the gas pressure in the melt chamber 31 is prevented from falling off in the event of the failure of pressure on the delivery side of the measuring pump 36.

Since the pressures on the inlet and outlet sides of the pump 36 are substantially equal, the pump is enabled to act accurately as a measuring pump, to deliver liquid at a constant volumetric rate to the filter 42 and jet 41. The power necessary to force the liquid through the filter and jet is derived not from the pump 36 but from the gas supplied at high pressure from the gas main 101 to the top of the chamber 31.

The gas supplied at 113 to the top of the chamber 31 acts on the upper surface of a heating liquid 117, which is not the liquid to be extruded but serves to melt solid material introduced into the vessel 31. The solid material is heavier than the liquid 117, and sinks through it until it reaches and is retained by a conical grid 118 as described in U. S. Patent No. 2,437,687, by which it is conducted to the walls of the chamber and is melted by convection currents induced in the liquid 117 by the supply of heat through the walls of the vessel. The molten material forms a pool 119 in the conical bottom of the chamber. For supplying heat through the walls of the chamber 31, the vessel 32 in which the chamber is formed is surrounded by a jacket 120 containing a molten alloy of equal parts of tin and lead 121 and heated by means of electrical heating elements 122 supplied with power by connections 123 from a power conduit 134 through the bracket 68. Auxiliary heating elements 124 are provided round the top flange of the vessel also supplied from the power conduit 134. The supply of power to the windings 122 is controlled in accordance with a temperature-sensitive instrument 125 emerging from the top of the vessel and dipping into the alloy 121 at 126. The feed of solid material to the melt chamber 31 is controlled, as described in British Patent No. 573,325, by means of a flat-based conical bulb 127, the base of which is situated at the level of the heating liquid 117. As the fused filament-forming material, collected at 119 in the conical bottom of the chamber 31, is drawn off for extrusion, the level of the liquid 117 falls. Between the liquid 117 and the gaseous phase above it, there exists a temperature difference so that, as the level of the liquid 117 falls, a temperature change is experienced by the temperature-sensitive element 127. This temperature change is utilised, as described in U. S. Patent No. 2,437,704, to feed further solid material through the feed mechanism 5 and the passage 128. A valve rod 129 operated by a hand-wheel 130 is provided to close the passage 33 to the molten material 119 when desired, and a second valve rod 131 operated by wheel 132 is provided in a bore in the rod 129, to permit the passage of heating liquid 117 through 33 by way of ports 133 and valve rod 129, for the purpose of starting up.

Fig. 10, besides showing a different section through the block 34 from that shown in Fig. 4, shows an alternative method of heating the vessel 32. In this case the vessel 32 is surrounded by a pressure-tight jacket 135 heated at the bottom by electrical heating elements 136 and containing a liquid having a suitable range of boiling points under different pressures, e. g. a mixture of diphenyl and diphenyl oxide. The control of the temperature in the jacket 135 is brought about by controlling the supply of heat so as to keep the pressure constant. A pressure lead 138 leads to a pressure-sensitive element by means of which the power supplied to the heating element 136 is readily and accurately controlled, without the necessity of complicated and delicate relays and the like, the pressure itself supplying ample power for the purpose.

As stated above, the invention is applicable to the delivery of liquids generally at a constant volumetric rate and particularly to the extrusion of filament-forming liquids, and more particularly to the extrusion of fused filament-forming materials. Examples of materials that may be extruded in the fused state are the synthetic linear polyamides made, for example, by the condensation of diamines with dicarboxylic acids, and polyvinyl compounds, for example polyvinylidene chloride and copolymers of vinyl chloride and vinyl acetate. Other filament-forming liquids that may be extruded are solutions in volatile solvents of cellulose derivatives, such as organic esters of cellulose (including mixed esters) e. g. cellulose acetate, cellulose propionate, cellulose butyrate, cellulose acetate-butyrate, cellulose acetate-propionate and cellulose acetate-stearate, or cellulose ethers such as ethyl and benzyl cellulose.

Having described my invention, what I desire to secure by Letters Patent is:

1. Apparatus for delivering a liquid at a controlled volumetric rate, said apparatus comprising a pressure vessel for containing a supply of liquid, a measuring pump connected to said vessel for delivering said liquid therefrom, means for supplying under pressure to said vessel a fluid different from the liquid to be delivered, pressure-sensitive means subject to pressure differences between the inlet and outlet of said pump, and means under the control of said pressure-sensitive means for varying the pressure of said fluid so as to maintain said pressure-difference substantially null, whereby said pump is enabled to deliver said liquid at a controlled volumetric rate undisturbed by pressure differences between the inlet and the outlet of said pump.

2. Apparatus for delivering a liquid at a controlled volumetric rate, said apparatus comprising a pressure vessel for containing a supply of liquid, a measuring pump connected to said vessel for delivering said liquid therefrom, means for supplying under pressure to said vessel a fluid different from the liquid to be delivered, and pressure-sensitive means comprising a diaphragm that is subjected on one side to the pressure on the delivery side of said pump and on the other to the pressure in said pressure vessel and adapted, by movement under a difference between said pressures, to control the supply-pressure of said fluid so as to maintain said difference substantially null, whereby said pump is enabled to deliver said liquid at a controlled volumetric rate undisturbed by pressure differences between the inlet and the outlet of said pump.

3. Apparatus for delivering a liquid at a controlled volumetric rate, said apparatus comprising a pressure vessel for containing a supply of liquid, a measuring pump connected to said vessel for delivering said liquid therefrom, a conduit for connecting said pressure vessel to a source of supply of inert fluid under pressure, a resistance to fluid flow in said conduit, an outlet in said conduit between said resistance and said pressure vessel for permitting leakage of said fluid, pressure-sensitive means subject to pressure differences between the inlet and the outlet of said pump, and means under the control of said pressure-sensitive means for controlling the rate of said leakage so as to vary the pressure drop across said resistance and thereby the pressure applied in said vessel through said conduit and to maintain said pressure-difference substantially null, whereby said pump is enabled to deliver said liquid at a controlled volumetric rate undisturbed by pressure differences between the inlet and the outlet of said pump.

4. Apparatus for delivering a liquid at a controlled volumetric rate, said apparatus comprising a pressure vessel for containing a supply of liquid, a measuring pump connected to said vessel for delivering said liquid therefrom, a conduit for connecting said pressure vessel to a source of supply of inert fluid under pressure, a resistance to fluid flow in said conduit, a nozzle pointing inwards into said conduit between said resistance and said pressure vessel for permitting a leakage of said fluid, and a diaphragm subjected on one side to the pressure on the delivery side of said pump and on the other to the pressure in said conduit, said diaphragm being closely spaced from the mouth of said nozzle so as to control the rate of said leakage and thereby the pressure drop across said resistance, whereby the pressure applied in said vessel through said conduit is maintained substantially equal to the pressure on the outlet side of said pump and said pump is enabled to deliver said liquid at a controlled volumetric rate undisturbed by pressure differences between the inlet and the outlet of said pump.

5. Apparatus for delivering a liquid at a controlled volumetric rate, said apparatus comprising a pressure vessel for containing a supply of liquid, a measuring pump connected to said vessel for delivering said liquid therefrom, a conduit for connecting said pressure vessel to a source of supply of inert fluid under pressure, a resistance to fluid flow in said conduit, a nozzle pointing inwards into said conduit between said resistance and said pressure vessel for permitting leakage of said fluid, and a pair of diaphragms having an incompressible fluid enclosed between them, one of said diaphragms being subjected to the pressure on the delivery side of said pump and the other being subjected to the pressure in said conduit and being closely adjacent to the mouth of said nozzle so as to control the rate of said leakage and thereby the pressure drop across said resistance, whereby the pressure applied in said vessel through said conduit is maintained substantially equal to the pressure on the outlet side of said pump and said pump is enabled to deliver said liquid at a controlled volumetric rate undisturbed by pressure differences between the inlet and the outlet of said pump.

6. Apparatus for delivering a liquid at a controlled volumetric rate, said apparatus comprising a pressure vessel for containing a supply of liquid, a measuring pump connected to said vessel for delivering said liquid therefrom, a conduit for connecting said pressure vessel to a source of supply of inert fluid under pressure, a resistance to fluid flow in said conduit, an outlet in said conduit between said resistance and said pressure vessel for permitting leakage of said fluid, pressure-sensitive means subject to pressure differences between the inlet and the outlet of said pump, means under the control of said pressure-sensitive means for controlling the rate of said leakage so as to vary the pressure drop across said resistance and thereby the pressure applied in said vessel through said conduit and to maintain said pressure-difference substantially null, whereby said pump is enabled to deliver said liquid at a controlled volumetric rate undisturbed by pressure differences between the inlet and the outlet of said pump, and means for closing said leakage outlet on failure of the pressure on the outlet side of said pump.

7. Apparatus for delivering a liquid at a controlled volumetric rate, said apparatus comprising a pressure vessel for containing a supply of liquid, a measuring pump connected to said vessel for delivering said liquid therefrom, a conduit for connecting said pressure vessel to a source of supply of inert fluid under pressure, a resistance to fluid flow in said conduit, a nozzle pointing inwards into said conduit between said resistance and said pressure vessel for permitting a leakage of said fluid, a pair of diaphragms having an incompressible fluid enclosed between them, one of said diaphragms being subjected to the pressure on the delivery side of said pump and the other being subjected to the pressure in said conduit and being closely adjacent to the mouth of said nozzle so as to control the rate of said leakage and thereby the pressure drop across said resistance, whereby the pressure applied in said vessel through said conduit is maintained substantially equal to the pressure on the outlet side of said pump and said pump is enabled to deliver said liquid at a controlled volumetric rate undisturbed by pressure differences between the inlet and the outlet of said pump, a valve stem mounted on said diaphragm and entering said nozzle, and a valve member mounted on said stem within said nozzle and adapted, on failure of the pressure on the delivery side of said pump and consequent motion of said diaphragm away from said nozzle, to close said nozzle.

8. Apparatus for the extrusion of filament-forming liquids said apparatus comprising a pressure vessel for containing the liquid to be extruded, a measuring pump connected to said vessel for delivering the liquid therefrom, an extrusion orifice connected to and adapted to be supplied by said pump, means for supplying under pressure to said vessel a fluid different from the liquid to be delivered, pressure-sensitive means subject to pressure differences between the inlet and the outlet of said pump, and means under the control of said pressure-sensitive means for varying the pressure of said fluid so as to maintain said pressure-difference substantially null, whereby said pump is enabled to extrude said filament-forming liquid at a constant volumetric rate undisturbed by pressure differences between the inlet and the outlet of said pump.

9. Apparatus for the extrusion of filament-forming liquids said apparatus comprising a pressure vessel for containing the liquid to be extruded, a measuring pump connected to said vessel for delivering the liquid therefrom, an extrusion orifice connected to and adapted to be supplied by said pump, a conduit for connecting said pressure vessel to a source of supply of inert fluid under pressure, a resistance to fluid flow in said conduit, a nozzle pointing inwards into said conduit between said resistance and said pressure vessel for permitting leakage of said fluid, and a pair of diaphragms having an incompressible fluid enclosed between them, one of said diaphragms being subjected to the pressure on the delivery side of said pump and the other being subjected to the pressure in said conduit and being closely adjacent to the mouth of said nozzle so as to control the rate of said leakage and thereby the pressure drop across said resistance, whereby the pressure applied in said vessel through said conduit is maintained substantially equal to the pressure on the outlet side of said pump and said pump is enabled to extrude said filament-forming liquid at a constant volumetric rate undisturbed by pressure differences between the inlet and the outlet of said pump.

10. Apparatus for the extrusion of filament-forming liquids said apparatus comprising a pressure vessel for containing the liquids to be extruded, a measuring pump connected to said vessel for delivering the liquid therefrom, an extrusion orifice connected to and adapted to be supplied by said pump, a conduit for connecting said pressure vessel to a source of supply of inert fluid under pressure, a resistance to fluid flow in said conduit, a nozzle pointing inwards into said conduit between said resistance and said pressure vessel for permitting a leakage of said fluid, a pair of diaphragms having an incompressible fluid enclosed between them, one of said diaphragms being subjected to the pressure on the delivery side of said pump and the other being subjected to the pressure in said conduit and being closely adjacent to the mouth of said nozzle so as to control the rate of said leakage and thereby the pressure drop across said resistance, whereby the pressure applied in said vessel through said conduit is maintained substantially equal to the pressure on the outlet side of said pump and said pump is enabled to extrude said filament-forming liquid at a constant volumetric rate undisturbed by pressure differences between the inlet and the outlet of said pump, a valve stem mounted on said diaphragm and entering said nozzle, and a valve member mounted on said stem within said nozzle and adapted, on failure of the pressure on the delivery side of said pump and consequent motion of said diaphragm away from said nozzle, to close said nozzle.

WILLIAM POOL.

REFERENCES CITED

The following references are of record in the file of this patent:

UNITED STATES PATENTS

| Number | Name | Date |
|---|---|---|
| 1,781,231 | Hillebrand | Nov. 11, 1930 |
| 1,993,790 | Kinsella | Mar. 12, 1935 |